United States Patent [19]
Tanaka et al.

[11] Patent Number: 5,512,242
[45] Date of Patent: Apr. 30, 1996

[54] TIN-BASE WHITE METAL BEARING ALLOY EXCELLENT IN HEAT RESISTANCE AND FATIGUE RESISTANCE

[75] Inventors: Tadashi Tanaka; Masaaki Sakamoto; Hideyuki Kidokoro; Yoshiaki Sato; Yutaka Masuda, all of Nagoya, Japan

[73] Assignee: Daido Metal Company Ltd., Nagoya, Japan

[21] Appl. No.: 317,558

[22] Filed: Oct. 4, 1994

[30] Foreign Application Priority Data

Dec. 27, 1993 [JP] Japan .................................. 5-332188

[51] Int. Cl.$^6$ .......................... C22C 13/00; C22C 13/02
[52] U.S. Cl. ........................ 420/561; 148/400; 148/405
[58] Field of Search ...................................... 420/559, 561, 420/562; 148/400, 405

[56] References Cited

FOREIGN PATENT DOCUMENTS

| | | |
|---|---|---|
| 4517065 | 6/1970 | Japan . |
| 5314614 | 2/1978 | Japan . |
| 1523665 | 6/1976 | United Kingdom . |
| 1577557 | 6/1977 | United Kingdom . |

*Primary Examiner*—David L. Lacey
*Assistant Examiner*—Sean Vincent
*Attorney, Agent, or Firm*—Browdy and Neimark

[57] ABSTRACT

A tin-base white metal bearing alloy essentially consists of, by weight, more than 3% and up to 15% Sb, more than 2% and up to 10% Ni, more than 0.001% and up to 1% Cr, up to 9% Cu, and balance of Sn and incidental impurities. Since Ni increases the strength at high temperature and the melting point, heat resistance and fatigue resistance as a tin-base white metal bearing alloy are improved. In this case, the strength will be further improved by containing at least one element of Cd, Be, Co and Mn whose amount or total amount is more than 0.1% and up to 5% by weight.

10 Claims, 5 Drawing Sheets

INVENTION SPECIMEN NO. 4

INVENTION SPECIMEN NO. 5

F I G. 3
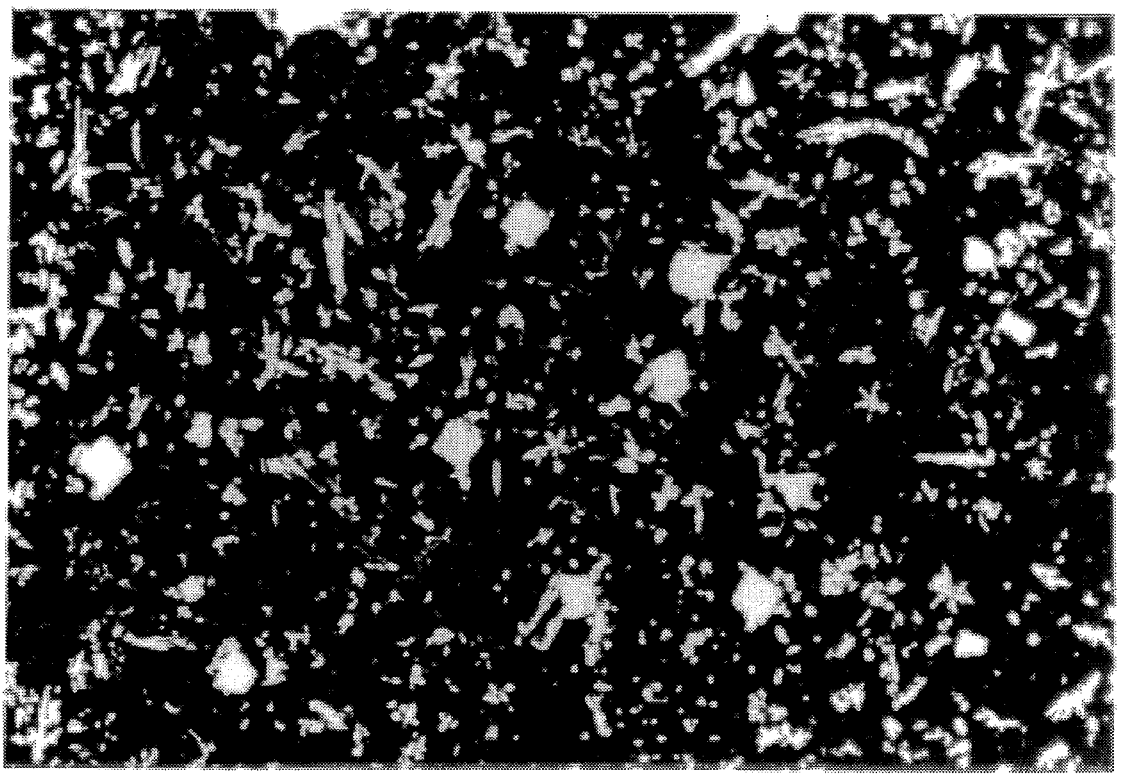
INVENTION SPECIMEN NO. 10

CONVENTIONAL BEARING ALLOY SPECIMEN NO. 2

CONVENTIONAL BEARING ALLOY SPECIMEN NO. 3

TIN-BASE WHITE METAL BEARING ALLOY EXCELLENT IN HEAT RESISTANCE AND FATIGUE RESISTANCE

TECHNICAL BACKGROUND OF THE INVENTION

The present invention relates to a tin-base white metal bearing alloy improved in heat resistance and fatigue resistance.

In general, tin-base white metal bearing alloys comprise tin as a base metal to which Sb and Cu are added. Tin-base white metal bearing alloys usually have a composition of 5 to 13% Sb, 3 to 9% Cu, 0 to 4% Pb, and balance of Sn. Of such alloys, the alloys which do not contain Pb are employed for bearings for high-speed high-load application, e.g., bearings for diesel engines of marine vessels. However, the conventional white metal bearing alloys are not necessarily satisfactory in toughness, high-temperature strength, fatigue limit and so forth. In accordance with enlargement and power increase of diesel engines for marine vessels in recent years, there has been an increasing demand for enhancing toughness, high-temperature strength and fatigue limit of bearings.

White metal bearing alloys to answer this demand are disclosed in JP-B-45-17065 and JP-A-53-14614.

A tin-base white metal bearing alloy has a structure in which $Cu_6Sn_5$ of acicular crystals structure (εphase) and SbSn of cubic crystals structure (βphase) are distributed over a soft matrix. The soft tin-base matrix exhibits an excellent surface property as a bearing and high conformability with respect to the surface of the associated rotary shaft. In addition, the above-mentioned hard compounds distributed over the soft matrix have favorable wear resistance and favorable load carrying capacity. With these properties being combined, the tin-base white metal bearing alloy serves as an excellent bearing alloy.

It is generally known that cracking in a bearing alloy occurs in relation to the tensile strength, the impact load resistance relates to the toughness, and growth of cracking mainly relates to the fineness of the structure. Therefore, occurrence of cracking can be prevented by increasing the tensile strength of the alloy, higher resistance to an impact load can be obtained by improving the toughness, and higher resistance to occurrence of cracking can be obtained by increasing the fineness of the structure.

From this point of view, in the white metal bearing alloy disclosed in JP-B-45-17065, Cd, Be and Cr are added to a tin-base white metal so as to enhance the tensile strength and toughness, and the fineness of the structure is increased to enhance the fatigue limit.

Also, in the white metal bearing alloy disclosed in JP-A-53-14614, Mn, Ni, Cr and Co are added to a tin-base white metal so as to enhance the tensile strength and toughness, and the fineness of the structure is increased to enhance the fatigue limit.

However, in the white metal bearing alloys disclosed in JP-B-45-17065 and JP-A-53-14614, the heat resistance is insufficient, the strength at high temperature is low, and the fatigue resistance is low. Consequently, it is difficult to use these bearing alloys for diesel engines of marine vessels which are remarkably increasing in size and power.

SUMMARY OF THE INVENTION

The present invention has been achieved in consideration of the above-described situations. It is an object of the invention to provide a tin-base white metal bearing alloy having higher heat resistance and higher fatigue resistance at high temperature.

A tin-base white metal bearing alloy excellent in heat resistance and fatigue resistance according to the invention essentially consists of, by weight, more than 3% and up to 15% Sb, more than 2% and up to 10% Ni, more than 0.001% and up to 1% Cr, up to 9% Cu, and balance of Sn and incidental impurities.

The tin-base white metal bearing alloy can further contain one or more of Cd, Be, Co and Mn whose amount or total amount is more than 0.1% and up to 5% by weight.

As a result of various experiments, the present inventors have found that addition of appropriate amounts of Ni and Cr to a tin-base white metal bearing alloy is effective in increasing the fineness of the structure, enhancing the heat resistance, and enhancing the fatigue strength at high temperature.

The white metal bearing alloy disclosed in JP-B-45-17065 mentioned the above contains, by weight, 0.005 to 0.2% Cr but does not contain Ni. The white metal bearing alloy disclosed in JP-A-53-14614 contains, by weight, 0.001 to 0.5% Cr but does not contain Ni at all or contains only 2% or less Ni. On the other hand, it should be noted that the tin-base white metal bearing alloy of the invention contains more than 2% and up to 10% Ni and more than 0.001% and up to 1% Cr. Because of the above differences, the present invention alloy has higher resistance to heat fatigue.

BRIEF DESCRIPTION OF THE DRAWINGS

FIG. 3 is a photograph showing a micro structure of a bearing alloy specimen No. 10 according to the invention (at a magnification of 100);

DETAILED DESCRIPTION OF THE INVENTION

Figure 1:
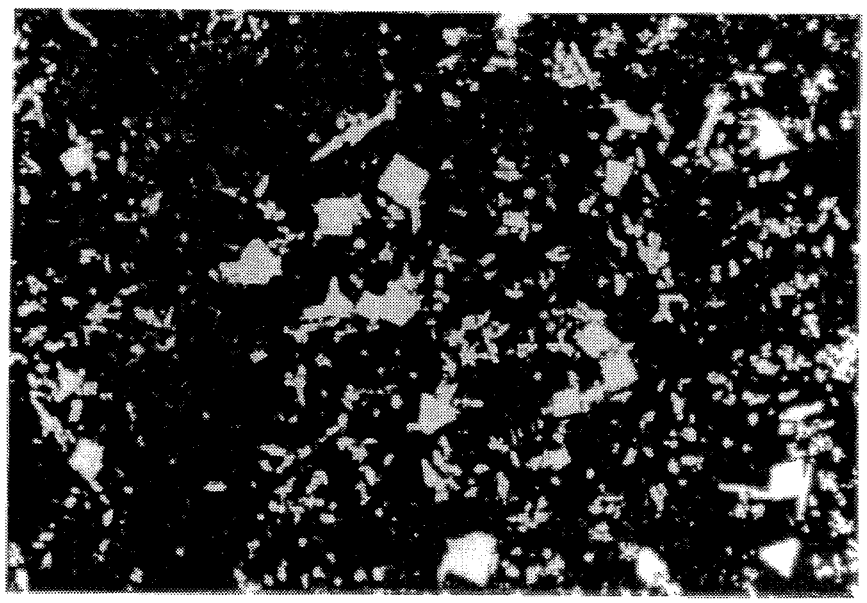
FIG. 1 is a photograph showing a micro structure of a bearing alloy specimen No. 4 according to the invention (at a magnification of 100)
Figure 2:
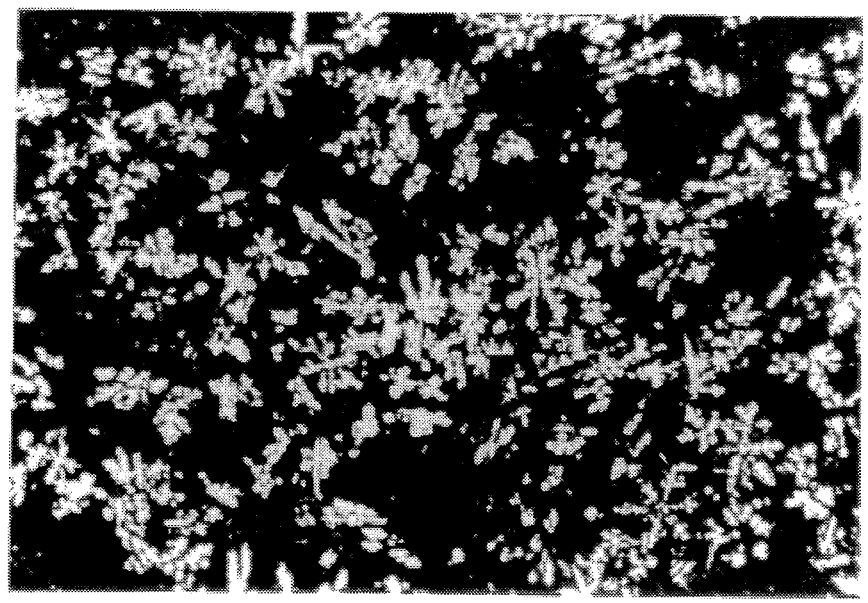
FIG. 2 is a photograph showing a micro structure of a bearing alloy specimen No. 5 according to the invention (at a magnification of 100)

Reasons for determining amounts of alloy components as mentioned above in the invention will now be described.

(1) Sb: more than 3% and up to 15%

When the Sb content is 3% or less, remarkable effects of high-temperature hardness and fatigue resistance can not be produced. When it exceeds 15%, the alloy becomes brittle, and the workability in rolling or the like is inferior. A preferable amount of Sb is 5 to 14%.

(2) Ni: more than 2% and up to 10%

Ni increases the strength at high temperature and the melting point. Conventionally, acicular crystals of $Cu_6Sn_5$ have been observed in the structure, and the Vickers hardness (hereinafter referred to as Hv) has been about 260. However, a compound $Ni_3Sn_2$ obtained when Ni is added is characterized in that the Hv is 560 and extremely high. When the Ni content is 2% or less, Ni produces poor effects. When it exceeds 10%, the alloy becomes brittle, and the workability is inferior. A preferable amount of Ni is 2.1 to 8%.

(3) Cr: more than 0.001% and up to 1%

Cr makes crystals finer, and increases the high-temperature strength and elongation (toughness). When the Cr content is 0.001% or less, Cr produces no effects. Even if more than 1% Cr is added, its effects will not be changed. Addition of Cr more than necessary increases the oxidization property of molten metal, and also deteriorates the castability. A preferable amount of Cr is 0.05 to 0.3%.

(4) Cu: up to 9%

Cu increases the strength in proportion to its additive amount. When the Cu content exceeds 9%, extremely hard crystals are generated so that the associated shaft will be worn. A preferable additive amount of Cu is up to 5%.

(5) One or more of Cd, Be, Co and Mn: more than 0.1% and up to 5% in total

Cd increases the strength without deteriorating the toughness. When the Cd content is 0.1% or less, an increase in the strength is small. When it exceeds 2%, the alloy becomes brittle, and the melting point is lowered due to eutectic reaction with Sn, thereby degrading the high-temperature strength.

Be makes crystals finer on account of synergism with Ni and Cr, thereby increasing the strength and the elongation.

Co makes crystals finer on account of synergism with Ni and Cr, and the elongation increases as a result of heat treatment.

Mn makes crystals finer on account of synergism with Cr, thereby enhancing the strength.

Example

Embodiments of bearing alloys of the invention will be hereinafter described.

The invention bearing alloy essentially consists of, by weight, more than 3% and up to 15% Sb, more than 2% and up to 10% Ni, more than 0.001% and up to 1% Cr, up to 9% Cu, and balance of Sn and incidental impurities. The bearing alloy can further contain one or more of Cd, Be, Co and Mn whose amount or total amount is more than 0.1% and up to 5% by weight.

Ni is an element which the conventional bearing alloy does not contain or contains slightly. In order to confirm the influence of Ni to the bearing alloy of the invention which had the foregoing composition, specimens of the invention bearing alloy containing various amounts of Ni and specimens of the conventional bearing alloy for comparison were manufactured. Then, hardness and tensile strength of each specimen were measured. The measurement results as well as compositions of the specimens are shown in Table 1. Further, appropriate specimens were selected from the specimens shown in Table 1, and their alloy structures are shown in FIGS. 1 to 5. Moreover, appropriate specimens were selected similarly from the specimens shown in Table 1, and their hardness changes in accordance with temperature changes were measured. The measurement results are shown in FIG. 6.

TABLE 1

| SPECIMEN NO. | COMPONENT (wt %) | | | | | | | | | PROPERTIES | | |
|---|---|---|---|---|---|---|---|---|---|---|---|---|
| | Sn | Sb | Cu | Ni | Cr | Cd | Be | Co | Mn | HARDNESS Hv.5 | TENSILE STRENGTH N/mm² | (kg/mm²) |
| CONVENTIONAL ALLOY | | | | | | | | | | | | |
| 1 | Bal. | 7 | 3 | — | — | — | — | — | — | 23.0 | 53.9 | (5.5) |
| 2 | Bal. | 8 | 3 | 1 | — | — | — | — | — | 26.6 | 68.6 | (7.0) |
| 3 | Bal. | 9 | 4 | — | — | — | — | — | — | 24.2 | 66.6 | (6.8) |
| 4 | Bal. | 9 | 3 | — | 0.1 | 0.8 | 0.1 | — | — | 26.4 | 86.2 | (8.8) |
| INVENTION ALLOY | | | | | | | | | | | | |
| 1 | Bal. | 3.5 | 5 | 5 | 0.1 | — | — | — | — | 24.3 | 71.5 | (7.3) |
| 2 | Bal. | 5 | 5 | 8 | 0.1 | — | — | — | — | 26.0 | 78.4 | (8.0) |
| 3 | Bal. | 5 | 2.5 | 10 | 0.1 | — | — | — | — | 29.5 | 107.8 | (11.0) |
| 4 | Bal. | 9 | 2.5 | 2.5 | 0.1 | — | — | — | — | 27.2 | 102.9 | (10.5) |
| 5 | Bal. | 9 | 2.5 | 5 | 0.1 | — | — | — | — | 32.4 | 122.5 | (12.5) |
| 6 | Bal. | 9 | 2.5 | 5 | 0.3 | — | — | — | — | 33.7 | 127.4 | (13.0) |
| 7 | Bal. | 14 | 2.5 | 2.1 | 0.1 | — | — | — | — | 29.1 | 109.8 | (11.2) |
| 8 | Bal. | 9 | 2.5 | 2.5 | 0.1 | 0.75 | 0.01 | — | — | 28.3 | 103.9 | (10.6) |
| 9 | Bal. | 9 | 2.5 | 2.5 | 0.05 | — | — | 0.1 | 0.1 | 27.7 | 106.8 | (10.9) |
| 10 | Bal. | 9 | 2.5 | 2.5 | 0.1 | 0.75 | 0.01 | 0.1 | 0.1 | 30.8 | 114.7 | (11.7) |

As obviously understood from comparison of the conventional bearing alloy specimens 1, 3 and 4 which do not contain Ni, with the invention bearing alloy specimens 1 to 10 which contain Ni in Table 1, the invention bearing alloy specimens are more excellent both in hardness and tensile strength.

Hardness and tensile strength of the invention specimens 1 and 2 are lower than those of the conventional bearing alloy specimens 3 and 4. The reason is that the conventional bearing alloy specimens 3 and 4 contain larger amounts of Sb, Cu and Cd, which have effects of increasing the strength, than the invention specimens 1 and 2, so that their effects are produced more conspicuously.

The conventional bearing alloy specimen 2 contains 11% of Sb and Cu in total, and 1% Ni. Therefore, the hardness is Hv 26.6, and the tensile strength is 68.6 N/mm² (7.0 kg/mm²). The strength of the specimen 2 is relatively high. On the other hand, the invention specimens 4 to 6 and 8 to 10 contain similar amounts of Sb and Cu as the conventional bearing alloy specimen 2, but contain more than 2% Ni so that the hardness is Hv 27.2 or higher, and the tensile strength is 102.9 N/mm² (10.5 kg/mm²) or higher. Both the hardness and the tensile strength of the invention specimens 4 to 6 and 8 to 10 are higher than those of the conventional specimen 2 including only 1% Ni, which results in excellent strength of the invention bearing alloy specimens.

Thus, it can be understood that by adding more than 2% Ni, the bearing alloy of the invention is higher both in hardness and tensile strength than the conventional bearing alloy.

Although the invention specimen 3 includes 10% Ni, it is lower in hardness and tensile strength than the other invention specimens 10 or 5 and 6 which include only 2.5% or 5% Ni. It can be understood that the limit of the Ni content for improving the strength is 10%, and further improvement of the strength can not be expected even if the bearing alloy contains more than 10% Ni.

The invention specimen 6 contains 0.3% Cr. When the invention specimen 6 is compared with, for example, the invention bearing alloy specimen 5 which includes only 0.1% Cr, it can be understood that addition of Cr further improves the hardness and the tensile strength.

Moreover, when, for example, the invention specimen 4 is compared with the invention specimens 8 to 10, it can be understood that addition of Cd, Be, Co and Mn improves the hardness and the tensile strength to an even further degree.

The invention specimen 7 including 14% Sb which improves the strength, is higher in hardness and tensile strength than the invention bearing alloy specimen 4 including only 9% Sb. An increase of the Sb content is effective for improving the hardness and the tensile strength.

The limit of the Cr content and the limit of the Sb content are 1% and 15%, respectively. It has already been confirmed by different experiments that even if Cr and Sb are added over the limits, further improvement of the hardness and the tensile strength can not be obtained.

Figure 4:
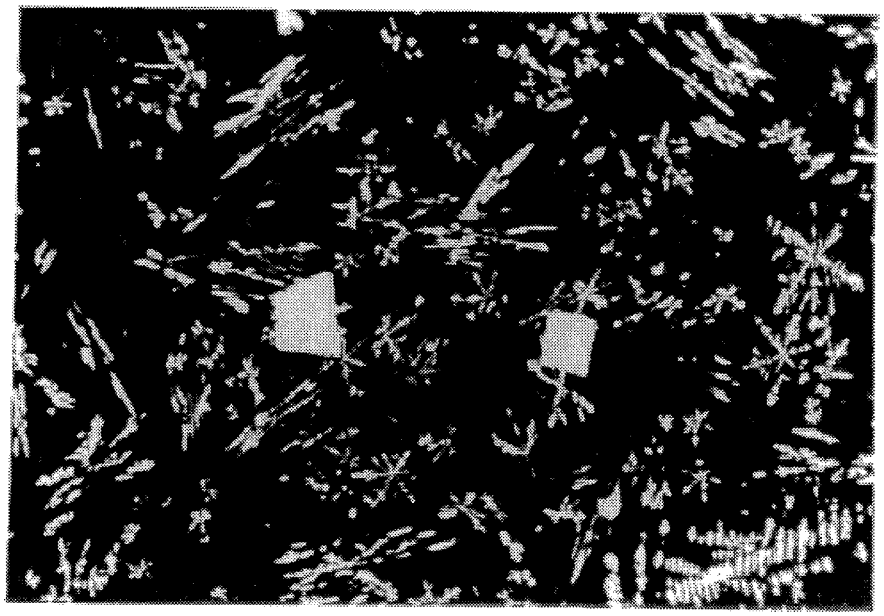
FIG. 4 is a photograph showing a micro structure of a conventional bearing alloy specimen No. 2 (at a magnification of 100)
Figure 5:
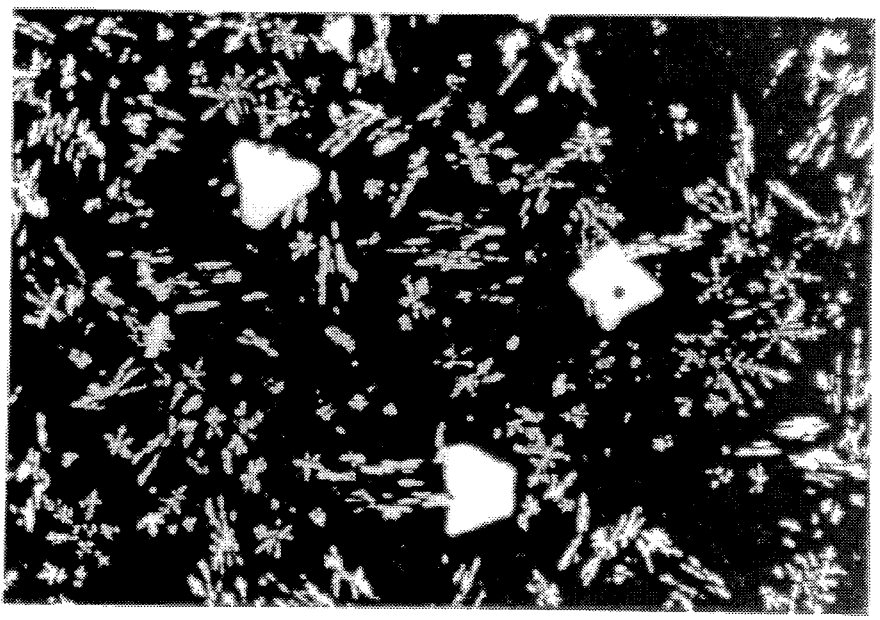
FIG. 5 is a photograph showing a micro structure of a conventional bearing alloy specimen No. 3 (at a magnification of 100)
Figure 6:
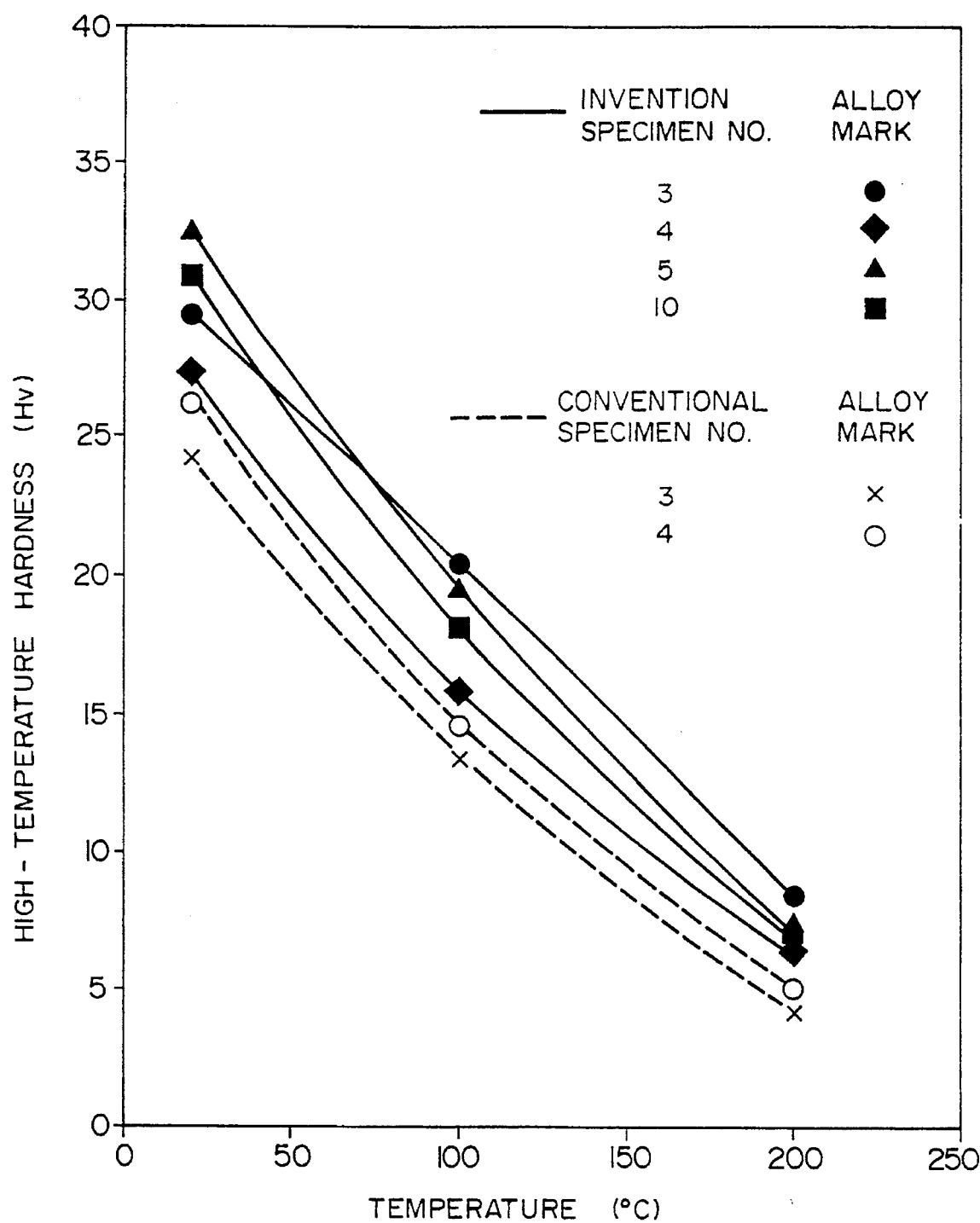
FIG. 6 is a graph illustrative of a relationship between temperature changes and hardness of specimens selected from Table 1.

As obviously understood from FIGS. 1 to 5 showing the alloy structures, the invention bearing alloy specimens 4, 5 and 10 (FIGS. 1, 2 and 3) have finer structures than the conventional bearing alloy specimen 2 and 3 (FIGS. 4 and 5). More specifically, as compared with the conventional bearing alloy specimen 3 (FIG. 5) which does not include Ni and Cr, cubic crystals (SbSn) and acicular crystals ($Cu_6Sn_5$, $Ni_3Sn_2$) are finer in the invention specimens 4, 5 and 10 (FIGS. 1, 2 and 3) to which Ni and Cr are added. Especially in the invention specimen 5 (FIG. 2) to which a large amount of Ni is added, cubic crystals (SbSn) are even finer. However, the conventional bearing alloy specimen 2 (FIG. 4), to which a small amount of Ni is added, has a structure of low fineness. The invention specimens whose structures are made finer by adding Ni and Cr in the above-described manner, are increased in tensile strength and toughness, and are also increased in fatigue strength.

As shown in FIG. 6, the invention specimens 3 to 5 and 10 containing more than 2% Ni are more excellent in hardness at high temperature than the conventional bearing alloy specimens 3 and 4 which do not contain Ni. As obviously understood from comparison of the invention specimens 3 to 5 and 10, the invention specimen 5 including 5% Ni is higher in high-temperature hardness than the invention specimens 4 and 10 including only 2.5% Ni. Further, the invention specimen 3 including 10% Ni is higher in high-temperature hardness than the invention specimen 5 including 5% Ni. Consequently, it can be understood from FIG. 6 that Ni is effective for increasing the melting point and improving the hardness at high temperature.

The bearing alloy according to the present invention which has high hardness and high tensile strength, as described above, exhibits the effect of improvement of the heat resistance by containing Ni, and the effect of increasing fineness of crystals by containing Ni, Cr and so forth. In addition, the bearing alloy of the invention exhibits strong resistance against cracking and its spread, thereby improving the fatigue strength at high temperature.

Figure 7:
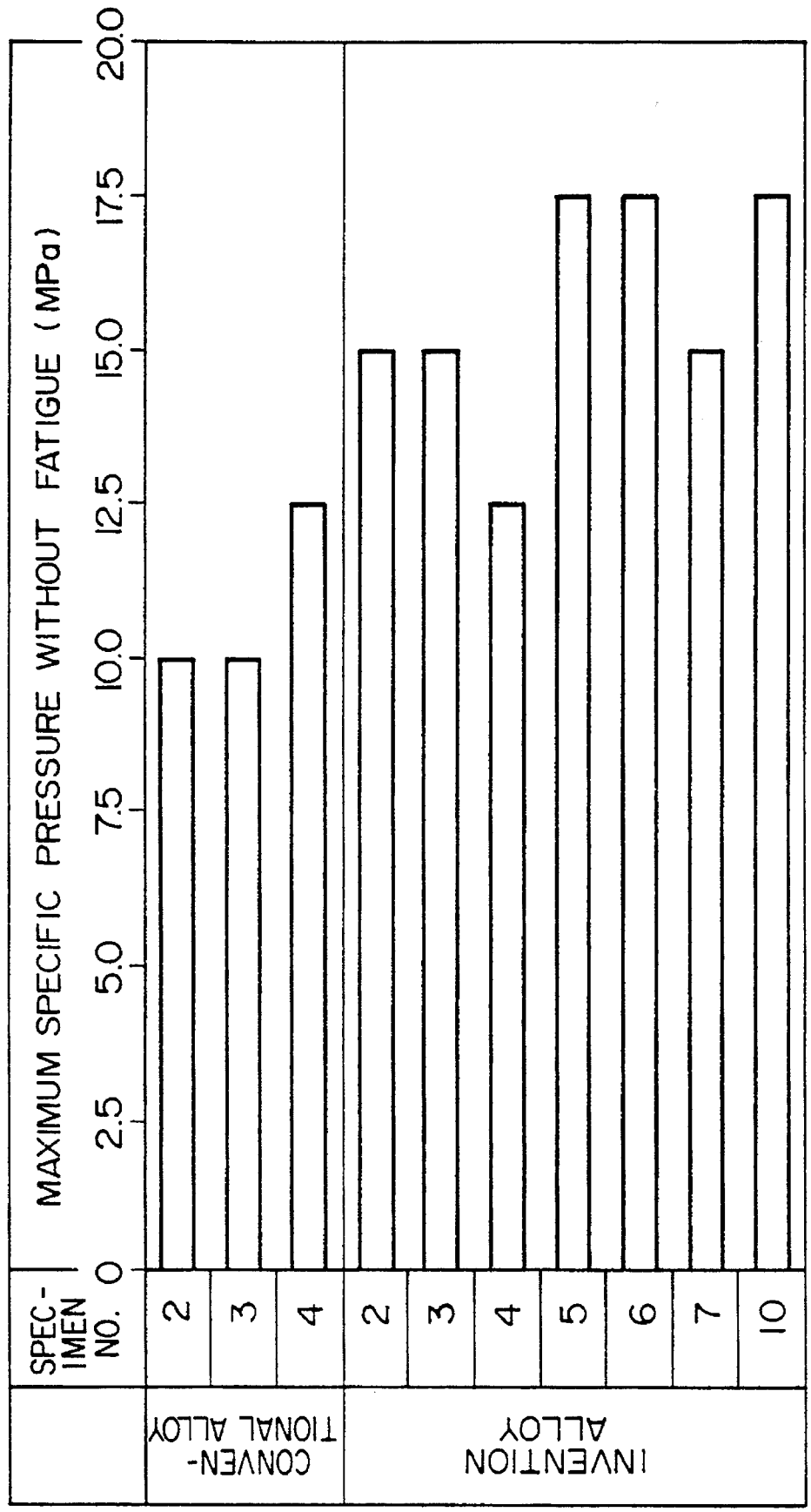
FIG. 7 is a graph illustrative of results of fatigue tests of bearings which are made of materials selected from Table 1.

In order to confirm this improvement of the fatigue strength, bearings were manufactured of the bearing alloy of the invention and the conventional bearing alloy, and fatigue tests were carried out under the conditions shown in Table 2. Results of the fatigue tests are shown in FIG. 7. It should be noted that specimen numerals shown in FIG. 7 denote bearings made of the alloy specimens which are designated by the same numerals in Table 1.

TABLE 2

| Test Condition | | |
|---|---|---|
| BEARING DIMENSIONS | INNER DIAMETER | 56 (mm) |
| | LENGTH | 17 (mm) |
| | WALL THICKNESS | 1.5 (mm) |
| ROTATIONAL SPEED | 4000 r.p.m. | |
| PERIPHERAL SPEED | 11.1 M/SEC. | |
| LUBRICANT OIL | SAE20 (MOTOR OIL) | |
| INLET TEMPERATURE | 60° C. | |
| FEED OIL PRESSURE | 0.29 Mpa | |
| LUBRICATION METHOD | SHAFT OIL SUPPLY | |
| | 60° C. (ANGLE OF ADVANCE) | |
| TEST TIME | 20 Hrs | |
| SHAFT | | |
| MATERIAL | JIS S55C | |
| ROUGHNESS | 1.0 (Rmax μm) | |
| HARDNESS | OVER HRC 55 | |

In order to manufacture bearings of the invention bearing alloys, billets of the bearing alloys obtained by, for example, pouring casting are rolled and formed into alloy plates, and the alloy plates are placed over low-carbon steel plates serving as backing plates, and rolled and bonded with pressure, thereby manufacturing bimetal plates. Then, the bimetal plates are mechanically worked and formed into half bearings.

As an alternative manufacturing method, the bearing alloys may be heated and melted, and the molten metals may be poured into cylindrical backing plates, so that lining layers of the bearing alloys will be formed on the inner peripheries of the cylindrical backing plates by centrifugal casting, thus producing bearings.

It can be obviously understood from FIG. 7 that the invention bearing alloy including more than 2% Ni is more excellent in fatigue resistance than the conventional bearing alloy which does not include Ni or includes Ni slightly.

According to the present invention, as has been described heretofore, the following effects can be obtained.

In the tin-base white metal bearing alloy according to claim 1, 2.1% to 10% Ni is included so that the heat resistance can be improved, and that the strength at high temperature can be enhanced, to thereby improve the fatigue resistance.

In the tin-base white metal bearing alloy according to claim 6, one or more of Cd, Be, Co and Mn whose amount or total amount is more than 0.1% and up to 5% are included, so that the heat resistance can be improved further, and that the strength at high temperature can be enhanced, to thereby improve the fatigue resistance.

What is claimed is:

1. A tin-base white metal bearing alloy excellent in heat resistance and fatigue resistance, consisting essentially of, by weight, more than 3% and up to 15% Sb, 2.1% to 10% Ni, more than 0.001% and up to 1% Cr, 2.5% to 9% Cu, and balance of Sn and incidental impurities.

2. A tin-base white metal bearing alloy according to claim 1 wherein the amount of Sb is 5–14%.

3. A tin-base white metal bearing alloy according to claim 1 wherein the amount of Ni is 2.1–8%.

4. A tin-base white metal bearing alloy according to claim 1 wherein the amount of Cr is 0.05–0.3%.

5. A tin-base white metal bearing alloy according to claim 1 wherein said amount of Cu is 2.5% to 5%.

6. A tin-base white metal bearing alloy excellent in heat resistance and fatigue resistance, consisting essentially of, by weight, more than 3% and up to 15% Sb, 2.1% to 10% Ni, more than 0.001% and up to 1% Cr, 2.5% to 9% Cu, at least one element Cd, Be, Co and Mn in a total amount more than 0.1% and up 5%, and balance of Sn and incidental impurities.

7. A tin-base white metal bearing alloy according to claim 6 wherein the amount of Sb is 5–14%.

8. A tin-base white metal bearing alloy according to claim 6 wherein the amount of Ni is 2.1–8%.

9. A tin-base white metal bearing alloy according to claim 6 wherein the amount of Cr is 0.05–0.3%.

10. A tin-base white metal bearing alloy according to claim 6 wherein said amount of Cu is 2.5% to 5%.

* * * * *